United States Patent Office 2,789,056
Patented Apr. 16, 1957

2,789,056

METHOD OF PREPARING COLORED POTATO CHIPS

Wilbur B. McColm and Glenn C. McColm, Long Beach, Calif.

No Drawing. Application August 19, 1955, Serial No. 529,587

1 Claim. (Cl. 99—100)

This invention relates to a method of preparing colored potato chips.

This application is a continuation-in-part of our application Serial No. 283,134, filed April 18, 1952, now abandoned.

As is generally known, potato chips as at present manufactured are of a light brown color which is imparted thereto in the cooking operation.

Potato chips are much in demand at teas, picnics, lunches, and bed-time snacks, due to their apetizing flavor and to the fact that they are easily digested and are easy to serve.

While the usual brown color of potato chips has not been particularly objectionable, nevertheless it has been found that potato chips, if dyed in various selective colors or shades, are much improved in appearance, thereby rendering them more attractive and appealing, which is an important consideration both from the standpoint of sales and the serving thereof, particularly at the more select social gatherings.

It is, accordingly, a primary object of the invention to provide a method of preparing colored potato chips which is capable of being carried out in little more time and with little more equipment than is required in the present process of preparing potato chips.

A further, and highly important, object of the invention is the provision of successive steps in said method whereby soluble sugars in the raw potato chips are removed for rendering the chips white with resulting uniformly colored chips when subsequently subjected to a dyeing operation preparatory to the cooking thereof.

A further object of the invention is to provide a method of preparing potato chips which, in the course of preparation, are dyed in various selective colors or shades while retaining their appetizing flavor as well as their keeping qualities.

Other objects and advantages of the invention will become apparent in the course of the following detailed description of the improved method.

The improved method or process includes the usual initial steps of peeling and slicing the potatoes and thereafter subjecting the slices or chips to a washing operation for removing the starch therefrom.

The present method, however, deviates substantially from the usual method of preparing potato chips in the provision of various colored cooked chips.

It has been found that in order to avoid showing of the brown through the color or dye of the chips when cooked it is necessary to render the raw chips, from which the starch has been removed, white, which is accomplished by removal of sugars, such as glucose or sucrose, from the potato chips.

It has also been found that the potato cell walls are what is known as a differentially permeable membrane which restricts the movement of the sugar to the outside of the cells. Accordingly, the present improved method comprises successive novel steps subsequent to the starch removing step by which the sugar is removed and which steps are (a) subjecting the chips to the action of a hot water bath for approximately two minutes at a temperature of approximately 160° F., which step results in changing the permeability of the cell walls, thereby allowing the sugar to escape from the cells to the potato tissue, and (b) subjecting the chips to a washing operation for approximately five minutes in a bath at approximately 120° F., which step results in diffusal of the sugar outside of the cell walls into the water of the bath.

The higher the temperature of the water, the whiter the chips will be, and, furthermore, the crisper the chips will be when they have been cooked. Experiments have, however, shown that the above indicated temperatures provide the best results.

After the raw potato chips have been prepared in the manner above described, they are subjected to a coloring or dyeing operation. The dye used is commercially known as "Ben Hur liquid food color" and is commercially prepared by mixing the dye with water, citric acid, and one-tenth of one percent sodium benzoate as a preservative. This dye is not, per se, novel and is purchasable already mixed.

The different colors desired are obtained by mixing two or more base colors together, thus a mixture of two parts red and six parts yellow will produce orange, five parts red and one part yellow will produce strawberry, four parts yellow and one part green will produce lime green, three parts red and one part blue will produce lavender, three parts red and three parts blue will produce violet, and four parts red and four parts yellow will produce peach.

The white potato chips prepared in the manner above described are placed in a solution of the dye (of any desired color) mixed in the ratio of one part dye to one hundred parts water heated to a temperature of 110° F. The chips are retained in the dye bath for a period of from one minute, for a pastel shade, to three minutes for a darker shade. After the dyeing operation the potato chips are subjected to the usual cooking operation.

From the above, it will be noted that the complete process, briefly stated, consists in (a) peeling and slicing the potatoes in the preparation of the raw potato chips, (b) subjecting the raw chips to a washing operation to remove the starch, (c) subjecting the raw chips to the action of a hot water bath for approximately two minutes at a temperature of approximately 160° F., (d) washing the chips in hot water for approximately five minutes at a temperature of approximately 120° F., (e) subjecting the chips to the action of a dye bath at a temperature of approximately 110° F. for a predetermined period dependent upon the color of the bath, and, thereafter, (f) cooking the dyed chips.

The above described process of preparing colored potato chips provides potato chips which have the same flavor and taste and also the same keeping qualities as the present brown chips, but they present a much more attractive appearance and are accordingly better suited for serving, particularly at parties or other social gatherings.

Having set forth the improved method or process in accordance with a preferred embodiment thereof, what we claim and desire to secure by U. S. Letters Patent is:

A process of preparing colored potato chips which comprises the following successive steps, peeling and slicing potatoes to provide raw potato chips, subjecting the chips to a washing operation for removing the starch therefrom, subjecting the chips to the action of a hot water bath at a temperature of approximately 160° F. and for a period of approximately two minutes to condition said chips for escape of sugar in the cells of the chips to the tissue thereof, and thereafter subjecting the chips to the action of a second hot water bath at a temperature of approximately 120° F. and for a period of approximately five minutes for diffusal of the freed sugar from the chip tissue into the water bath, thereby rendering the raw chips white, subjecting the raw white chips to the action of an edible dye solution for a predetermined period of time at a temperature of approximately 110° F., and finally subjecting the dyed chips to a cooking operation.

References Cited in the file of this patent

UNITED STATES PATENTS

| | | |
|---|---|---|
| 1,806,302 | Magrill | May 19, 1931 |
| 1,926,347 | Morrow | Sept. 12, 1933 |
| 2,286,644 | Pringle et al. | June 16, 1942 |
| 2,428,665 | Harrel et al. | Oct. 7, 1947 |

OTHER REFERENCES

"Improvement in the Color of Potato Chips and French Fries by Certain Precooking Treatments," by T. M. Whitman, pages 1 to 3, inclusive, reprinted from October 1951 (Potato Chipper).